United States Patent [19]

Long

[11] 4,347,025
[45] Aug. 31, 1982

[54] REPLACEABLE FUEL NOZZLE NUT LOCKWASHER

[75] Inventor: James M. Long, Windsor, Conn.

[73] Assignee: The United States of America as represented by the Secretary of the Navy, Washington, D.C.

[21] Appl. No.: 187,888

[22] Filed: Sep. 17, 1980

[51] Int. Cl.³ .................. F16B 39/02; F16L 35/00
[52] U.S. Cl. .................. 411/201; 239/600; 285/81; 285/382; 403/278
[58] Field of Search .............. 411/201, 204, 198, 192, 411/191, 190, 197, 220, 521, 520, 516, 540, 541, 360, 352; 285/382, 81; 403/278, 274; 239/600; 70/317, 319, 318, 320, 325, 324, 307 R; 24/20 CW, 20 EE, 20 R, 20 W, 16 R

[56] References Cited

U.S. PATENT DOCUMENTS

| | | | |
|---|---|---|---|
| 580,199 | 4/1897 | Sommerfeld | 24/20 EE |
| 1,223,591 | 4/1917 | Layne | 285/382 X |
| 2,108,032 | 2/1938 | Allen | 411/190 |
| 2,419,708 | 4/1947 | Cummings | 411/516 X |
| 4,315,348 | 2/1982 | Oetiker | 24/20 CW |

FOREIGN PATENT DOCUMENTS

| | | | |
|---|---|---|---|
| 783296 | 4/1968 | Canada | 24/20 CW |
| 359578 | 2/1962 | Switzerland | 24/20 EE |

Primary Examiner—Ramon S. Britts
Attorney, Agent, or Firm—Robert F. Beers; Robert W. Adams; David S. Kalmbaugh

[57] ABSTRACT

A replaceable fuel nozzle nut lockwasher adapted to fit about the periphery of a fuel nozzle nut so as to secure the fuel nozzle nut to a fuel nozzle. The replaceable fuel nozzle nut lockwasher comprises a pair of semicircular shaped members clinched together by a pair of tabs. A pair of grooves located within the fuel nozzle nut lockwasher prevent the axial movement of the fuel nozzle nut lockwasher upon the fuel nozzle nut. In addition, a pair of dimples located within the fuel nozzle nut lockwasher, and a third tab affixed to the fuel nozzle nut lockwasher prevent the rotational movement of the fuel nozzle nut lockwasher about the periphery of the fuel nozzle nut.

6 Claims, 2 Drawing Figures

REPLACEABLE FUEL NOZZLE NUT LOCKWASHER

BACKGROUND OF THE INVENTION

1. Field of the Invention

This invention relates generally to locking apparatus. In particular, this invention relates to a replaceable fuel nozzle nut lockwasher which may be locked upon the periphery of a fuel nozzle nut so as to secure the fuel nozzle nut to a fuel nozzle.

2. Description of the Prior Art

Modern day jet engines are subjected, during operation, to a variety of stresses. This, in turn, results in broken or loose fitting parts, including the fuel nozzle nut lockwashers incorporated in the aforementioned jet engines.

Presently, each fuel nozzle nut lockwasher comprises a one-piece band which is spun onto a fuel nozzle nut so as to secure the fuel nozzle nut to a fuel nozzle. A breakage of the fuel nozzle nut lockwasher requires removal of the fuel nozzle nut from the fuel nozzle. The fuel nozzle nut lockwasher must then be spun onto existing grooves within the fuel nozzle nut so as to provide for the positive retention thereof on the fuel nozzle nut. In addition, the fuel nozzle must be cleaned and calibrated, and a seal between the fuel nozzle nut and fuel nozzle must be replaced before assembly of the fuel nozzle nut to the fuel nozzle.

SUMMARY OF THE INVENTION

The subject invention overcomes some of the disadvantages of the prior art, including those mentioned above, in that it comprises a relatively simple replaceable fuel nozzle nut lockwasher which may be utilized to secure a fuel nozzle nut to a fuel nozzle.

Included in the subject invention are first and second semicircular shaped members adapted to fit around the periphery of the fuel nozzle nut. The semicircular shaped members are clinched together with a pair of tabs, and each member has therein a preformed groove which fits within a groove located in the fuel nozzle nut so as to prevent the axial movement of the fuel nozzle nut lockwasher upon the fuel nozzle nut. In addition, each member has therein a dimple which fits within a recess located in the fuel nozzle nut, and the first member has in the center thereof a tab which fits within a slot located in the fuel nozzle. This combination, in turn, prevents the rotational movement of the fuel nozzle nut lockwasher about the periphery of the fuel nozzle nut.

DESCRIPTION OF THE PREFERRED EMBODIMENT

Figure 1:
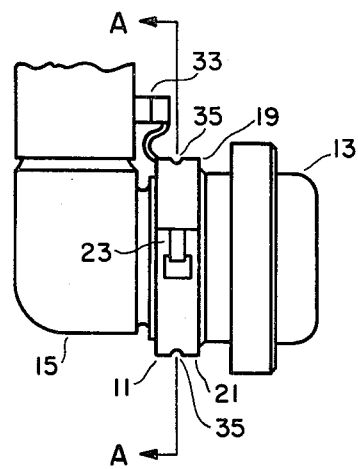
FIG. 1 is a side view of the replaceable fuel nozzle nut lockwasher constituting the subject invention.

The preferred embodiment of the subject invention will now be discussed in some detail in conjunction with all of the figures of the drawing, wherein like parts are designated by like reference numerals, insofar as it is possible and practical to do so.

Figure 2:
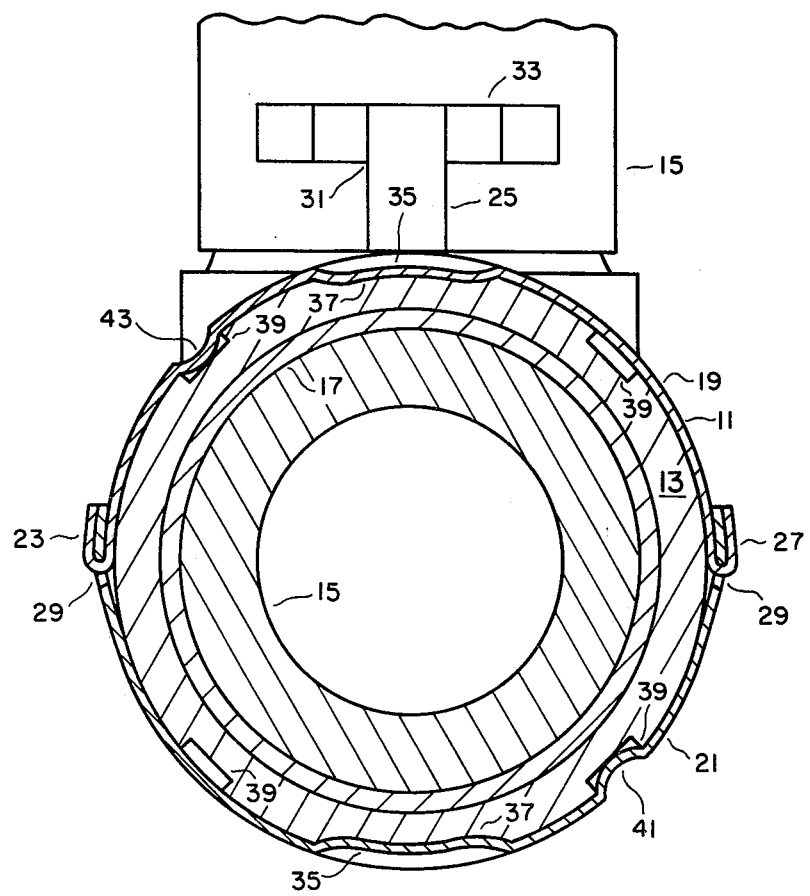
FIG. 2 is a front sectional view of the apparatus of FIG. 1, with the section disclosed having been taken at Section A—A thereof.

Referring now to FIGS. 1 and 2, there is shown a replaceable fuel nozzle nut lockwasher 11 which secures a fuel nozzle nut 13 to fuel nozzle 15. Positioned between the inner surface of fuel nozzle nut 13 and fuel nozzle 15 is a fuel seal 17.

Replaceable fuel nozzle nut lockwasher 11 comprises a pair of semicircular shaped members 19 and 21, the first of which is adapted to fit upon the upper portion of fuel nozzle nut 13, and the second of which is adapted to fit upon the lower portion of fuel nozzle nut 13. Semicircular shaped member 19 has positioned at one end thereof a tab 23, in the center thereof a tab 25, and at the opposite end thereof a tab 27.

Tabs 23 and 27 of semicircular shaped member 19 are adapted for insertion into a pair of apertures 29, each of which is located near one end of semicircular shaped member 21.

At this time it may be noteworthy to mention that semicircular shaped members 19 and 21 may be fabricated from a metal alloy which is thermally compatible with fuel nozzle nut 13. In particular, it has been found that a cobalt alloy PWA 1042 may be utilized to fabricate semicircular shaped members 19 and 21.

When it is desired to secure fuel nozzle nut 13 to fuel nozzle 15, fuel nozzle nut lockwasher 11 is locked around the periphery of fuel nozzle nut 13 by inserting tabs 23 and 27 through apertures 29, and then bending the aforementioned tabs 23 and 27 flush against the surface of semicircular shaped member 21 as shown in FIG. 1.

Fuel nozzle nut lockwasher 11 is prevented from rotating about the periphery of fuel nozzle nut 13 by tab 25 which is inserted in a slot 31 located within a locking lug 33. Locking lug 33 is, in turn, fixedly mounted upon fuel nozzle 15.

In addition, fuel nozzle nut lockwasher 11 has therein a pair of preformed grooves 35, the first of which is located in the center of semicircular shaped member 19, and the second of which is located in the center of semicircular shaped member 21. Preformed grooves 35 are, in turn, adapted to fit within a pair of grooves 37 located in fuel nozzle nut 13 so as to prevent the axial movement of fuel nozzle nut lockwasher 11 upon fuel nozzle nut 13.

Fuel nozzle nut 13 has on the periphery thereof a plurality of recesses 39. When fuel nozzle nut lockwasher 11 has been locked to fuel nozzle nut 13, a locking tool, not shown, may be utilized to crimp a pair of oppositely disposed dimples 41 and 43 into fuel nozzle nut lockwasher 11 such that dimple 41 fits within one of the plurality of recesses 39 of fuel nozzle nut 13, and dimple 43 fits within another of the plurality of recesses 39 of fuel nozzle nut 13. Dimples 41 and 43, along with tab 25, as mentioned above, prevent the rotational movement of fuel nozzle nut lockwasher 11 about the periphery of fuel nozzle nut 13.

From the foregoing, it may readily be seen that the subject invention comprises a new, unique and exceedingly useful replaceable fuel nozzle nut lockwasher which constitutes a considerable improvement over the known prior art. Obviously, many modifications and variations of the present invention are possible in light of the above teachings. It is, therefore, to be understood that within the scope of the appended claims the invention may be practiced otherwise than as specifically described.

What is claimed is:

1. A replaceable fuel nozzle nut lockwasher for securing a fuel nozzle nut to a fuel nozzle comprising, in combination:

a first semicircular shaped member adapted to fit upon the upper portion of said fuel nozzle nut, said first semicircular shaped member having a first tab located at one end thereof, a second tab located at the opposite end thereof, and a third tab located in the center thereof, said third tab adapted to fit within a slot located in said fuel nozzle so as to prevent the rotational movement of said fuel nozzle nut lockwasher about said fuel nozzle nut;

a second semicircular shaped member adapted to fit upon the lower portion of said fuel nozzle nut, said second semicircular shaped member having a pair of apertures, the first of which is adapted to receive the first tab of said first semicircular shaped member, and the second of which is adapted to receive the second tab of said first semicircular shaped member; and a pair of preformed grooves, the first of which is located in said first semicircular shaped member, and fits within a first groove located in said fuel nozzle nut, and the second of which is located in said second semicircular shaped member, and fits within a second groove located in said fuel nozzle nut, said pair of preformed grooves adapted to prevent the axial movement of said fuel nozzle nut lockwasher upon said fuel nozzle nut.

2. The replaceable fuel nozzle nut lockwasher of claim 1, wherein said first and second semicircular shaped members are fabricated from a cobalt alloy.

3. The replaceable fuel nozzle nut lockwasher of claim 1, further characterized by a pair of dimples, the first of which is located in said first semicircular shaped member and fits within a first recess located in said fuel nozzle nut, and the second of which is located in said second semicircular shaped member and fits within a second recess located in said fuel nozzle nut, said pair of dimples adapted to prevent the rotational movement of said fuel nozzle nut lockwasher about said fuel nozzle nut.

4. A locking apparatus for securing a fuel nozzle nut to a fuel nozzle comprising, in combination:

a first semicircular shaped member adapted to fit upon the upper portion of said fuel nozzle nut, said first semicircular shaped member having a first tab positioned at one end thereof, and a second tab positioned at the opposite end thereof;

a second semicircular shaped member adapted to fit upon the lower portion of said fuel nozzle nut, said second semicircular shaped member having a first aperture adapted to receive the first tab of said first semicircular shaped member, and a second aperture adapted to receive the second tab of said first semicircular shaped member;

a pair of preformed grooves, the first of which is located in said first semicircular shaped member and fits within a first groove located in said fuel nozzle nut, and the second of which is located in said second semicircular shaped member and fits within a second groove located in said fuel nozzle nut, said pair of preformed grooves adapted to prevent the axial movement of said locking apparatus upon said fuel nozzle nut; and a pair of dimples, the first of which is located in said first semicircular shaped member and fits within a first recess located in said fuel nozzle nut, and the second of which is located in said second semicircular shaped member and fits within a second recess located in said fuel nozzle nut, said pair of dimples adapted to prevent the rotational movement of said locking apparatus about said fuel nozzle nut.

5. The locking apparatus of claim 4, wherein said first and second semicircular shaped members are fabricated from a cobalt alloy.

6. The locking apparatus of claim 4, further characterized by a third tab positioned in the center of said first semicircular shaped member, said third tab adapted to fit within a slot located in said fuel nozzle so as to prevent the rotational movement of said locking apparatus about said fuel nozzle nut.

* * * * *